United States Patent
Liu

(10) Patent No.: US 12,495,892 B1
(45) Date of Patent: Dec. 16, 2025

(54) ELECTRIC CLEANING BRUSH

(71) Applicant: Shenzhen Dingshang Youpin E-commerce Co., Ltd., Shenzhen (CN)

(72) Inventor: Feifei Liu, Shenzhen (CN)

(73) Assignee: Shenzhen Dingshang Youpin E-commerce Co., Ltd., Shenzhen (CN)

( * ) Notice: Subject to any disclaimer, the term of this patent is extended or adjusted under 35 U.S.C. 154(b) by 0 days.

(21) Appl. No.: 19/259,650

(22) Filed: Jul. 3, 2025

(51) Int. Cl.
  *A46B 13/02* (2006.01)
  *A46B 5/00* (2006.01)
  *A46B 5/02* (2006.01)

(52) U.S. Cl.
  CPC .......... *A46B 13/02* (2013.01); *A46B 5/0012* (2013.01); *A46B 5/0095* (2013.01); *A46B 5/02* (2013.01); *A46B 2200/30* (2013.01)

(58) Field of Classification Search
  CPC ..... A46B 13/02; A46B 13/001; A46B 5/0012; A47L 11/40; A47L 11/282; A47L 11/26
  See application file for complete search history.

(56) References Cited

U.S. PATENT DOCUMENTS

| | | | | |
|---|---|---|---|---|
| 11,917,951 B2* | 3/2024 | Nie | .................. | A46B 13/02 |
| 2009/0243405 A1* | 10/2009 | Luo | .................. | A61C 17/3418 |
| | | | | 310/38 |

FOREIGN PATENT DOCUMENTS

| | | |
|---|---|---|
| CN | 113349679 A | 9/2021 |
| CN | 221105122 U | 6/2024 |
| CN | 221555448 U | 8/2024 |
| CN | 221963539 U | * 11/2024 |

* cited by examiner

*Primary Examiner* — Shay Karls
(74) *Attorney, Agent, or Firm* — Nitin Kaushik

(57) ABSTRACT

The invention discloses an electric cleaning brush, including a handle, a baffle and a brush head. The brush head includes a housing, roller brushes and a driving mechanism. The driving mechanism transmits power with a bevel gear set. A motor drives a first bevel gear and a second bevel gear to drive a transmission shaft through a connecting unit, so as to make the roller brushes roll, thereby solving the problem of shifting of a plane brush head. The brush head is detachably fitted with the handle, and the roller brushes can be replaced separately, thereby realizing modular maintenance. The electric cleaning brush has the advantages of compact overall structure, anti-shifting controllability and low maintenance cost.

8 Claims, 9 Drawing Sheets

ELECTRIC CLEANING BRUSH

TECHNICAL FIELD

The invention relates to the technical field of cleaning equipment, and in particular to an electric cleaning brush.

BACKGROUND

In daily life, cleaning is essential. People often use liquid cleaners with brushes, scouring pads and other tools to clean up stains. However, there are a great variety of stains in the home that are attached to surfaces of different materials and distributed in various locations, which makes the cleaning time-consuming and laborious. In order to improve cleaning efficiency and save labor, electric brushes have become the choice of many people. The electric brushes are suitable for cleaning places with heavy stains, such as gas stoves and range hoods, and places with a large area, such as tiles, floors and glass.

Nonetheless, the electric cleaning brushes in the prior art still have some defects. Most cleaning brush heads are designed based on plane rotation. During cleaning, the brush heads tend to shift to one side due to their rotation, causing a poor cleaning experience. In addition, the current cleaning devices usually do the cleaning through the brush heads, and do not have a scraping function, so it is difficult to remove some stains that need to be scraped.

Moreover, the brush heads of the existing cleaning devices cannot be fixed conveniently, so they are usually non-detachable, which leads to great inconvenience in the replacement and maintenance of the brush heads. In summary, in view of the status quo described above, a novel electric cleaning brush should be designed to meet the diversified needs in practical use and improve the cleaning convenience.

SUMMARY

In view of this, with regard to the defects in the prior art, a main objective of the invention is to provide an electric cleaning brush. A bevel gear set is used to efficiently change the direction of power, so as to solve the problem of high tendency to shifting of the traditional cleaning based on plane rotation. Modular connecting members are used to simplify the assembly of a driving mechanism and detachably connect a handle to a brush head and roller brushes to a transmission shaft, so as to solve the problems of large occupied space, high maintenance cost and complicated component replacement of the traditional cleaning brush and improve the practicability and economy of the product.

In order to achieve the above objective, the invention adopts the following technical solutions:

An electric cleaning brush includes a handle, a baffle and a brush head. The brush head is detachably mounted to a lower end of the handle, and the baffle covers a top of the brush head. The brush head includes a housing, roller brushes and a driving mechanism for driving the roller brushes to rotate, and the housing is detachably connected to the handle. The driving mechanism includes a motor, a connecting unit, a first bevel gear, a second bevel gear and a transmission shaft. The motor is mounted in the handle. The connecting unit is connected to a shaft end of the motor. The first bevel gear is connected to the connecting unit. The second bevel gear meshes with the first bevel gear. The transmission shaft is transversely connected to the second bevel gear. The housing covers an outside of the first bevel gear and the second bevel gear. Two ends of the transmission shaft transversely extend out of the housing. The roller brushes are detachably mounted to the two ends of the transmission shaft.

As a preferred solution, a retaining bracket is mounted in the housing. The first bevel gear is rotatably mounted to a lower end of a top wall of the retaining bracket. The connecting unit is connected to an upper end of the top wall of the retaining bracket and fitted with the first bevel gear. The second bevel gear is located below the retaining bracket, and the transmission shaft transversely runs through the retaining bracket and extends out of two sides of the housing.

As a preferred solution, an edge of the baffle is provided with curved grooves and scraping hooks which are convenient for scraping.

As a preferred solution, side walls of the lower end of the handle are provided with snap-fit protrusions. Side walls of the housing are provided with snap-fit holes corresponding to the snap-fit protrusions. The snap-fit protrusions are detachably fitted with the snap-fit holes.

As a preferred solution, the two ends of the transmission shaft are respectively provided with limiting grooves. A snap ring is detachably sleeved in each of the limiting grooves. The roller brush is located between the snap ring and the housing.

As a preferred solution, the baffle is transversely mounted to the lower end of the handle. A front side plate and a rear side plate formed from the baffle by separation of the handle are curved downward. An area of the rear side plate is greater than an area of the front side plate.

As a preferred solution, the curved grooves and the scraping hooks are all located on an edge of the rear side plate, and the scraping hooks are located on two sides of the rear side plate.

As a preferred solution, the lower end of the handle is provided with an end cover, and the shaft end of the motor runs downward into the end cover. The connecting unit includes an upper connecting member and a lower connecting member. The upper connecting member and the lower connecting member are fitted with each other and located in the end cover. The upper connecting member is connected to the shaft end of the motor. A V-shaped waterproof sealing ring is arranged between the upper connecting member and the motor, and an O-shaped waterproof ring is arranged between the end cover and the lower end of the handle.

As a preferred solution, the handle includes a main body portion and a hand-held portion arranged at an upper end of the main body portion. The hand-held portion has a holding structure for a hand of a user to pass through and hold. An inner wall and an outer top wall of the holding structure are respectively provided with a soft rubber layer.

As a preferred solution, a battery is further arranged in the main body portion. The battery is electrically connected to the motor. An outer wall of the handle is provided with an on/off button for controlling the motor to be on or off.

Compared with the prior art, the invention has significant advantages and beneficial effects. Specifically, according to the above technical solutions, the first bevel gear and the second bevel gear are used to change the direction of rotation, thereby solving the problem of high tendency to shifting of the traditional cleaning brush heads based on plane rotation. The cleaning brush of the invention has compact overall structure and small occupied space. The handle and the brush head that are detachably connected are used to realize quick assembly and disassembly of the handle and the brush head, and moreover, the handle and the brush head can be replaced as needed, which is flexible and convenient. Besides, the roller brushes are detachably fitted with the transmission shaft, so that the roller brushes are convenient to dismount and replace, thereby improving the utilization rate of the product, making the product convenient to maintain, and lowering the maintenance cost.

In order to more clearly explain the structural features and efficacy of the invention, the invention will be described in detail in conjunction with the accompanying drawings and specific embodiments.

DESCRIPTION OF REFERENCE SIGNS 10, handle; 11, snap-fit protrusion; 12, end cover; 13, O-shaped waterproof ring; 14, main body portion; 141, battery; 142, front housing; 143, rear housing; 144, waterproof silicone strip; 15, hand-held portion; 151, holding structure; 16, soft rubber layer; 17, on/off button; 18, USB charging port; 19, silicone plug; 20, baffle; 21, curved groove; 22, scraping hook; 23, front side plate; 24, rear side plate; 30, brush head; 31, housing; 311, retaining bracket; 312, snap-fit hole; 32, roller brush; 321, end cap; 33, driving mechanism; 331, motor; 332, connecting unit; 3321, upper connecting member; 3322, lower connecting member; 333, first bevel gear; 334, second bevel gear; 335, transmission shaft; 3351, limiting groove; 336, V-shaped waterproof sealing ring.

DETAILED DESCRIPTION OF THE EMBODIMENTS

Figure 1:
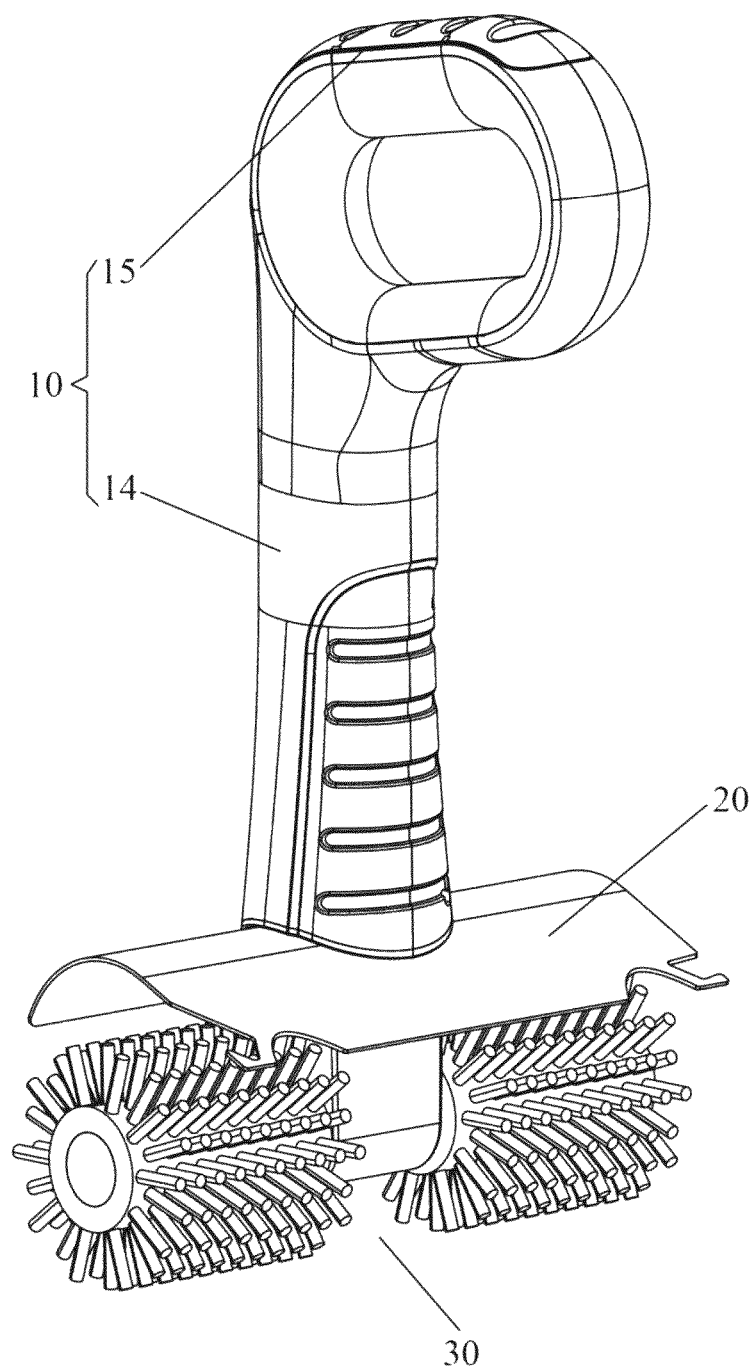
FIG. 1 is a schematic three-dimensional view of a cleaning brush according to the invention.
Figure 2:
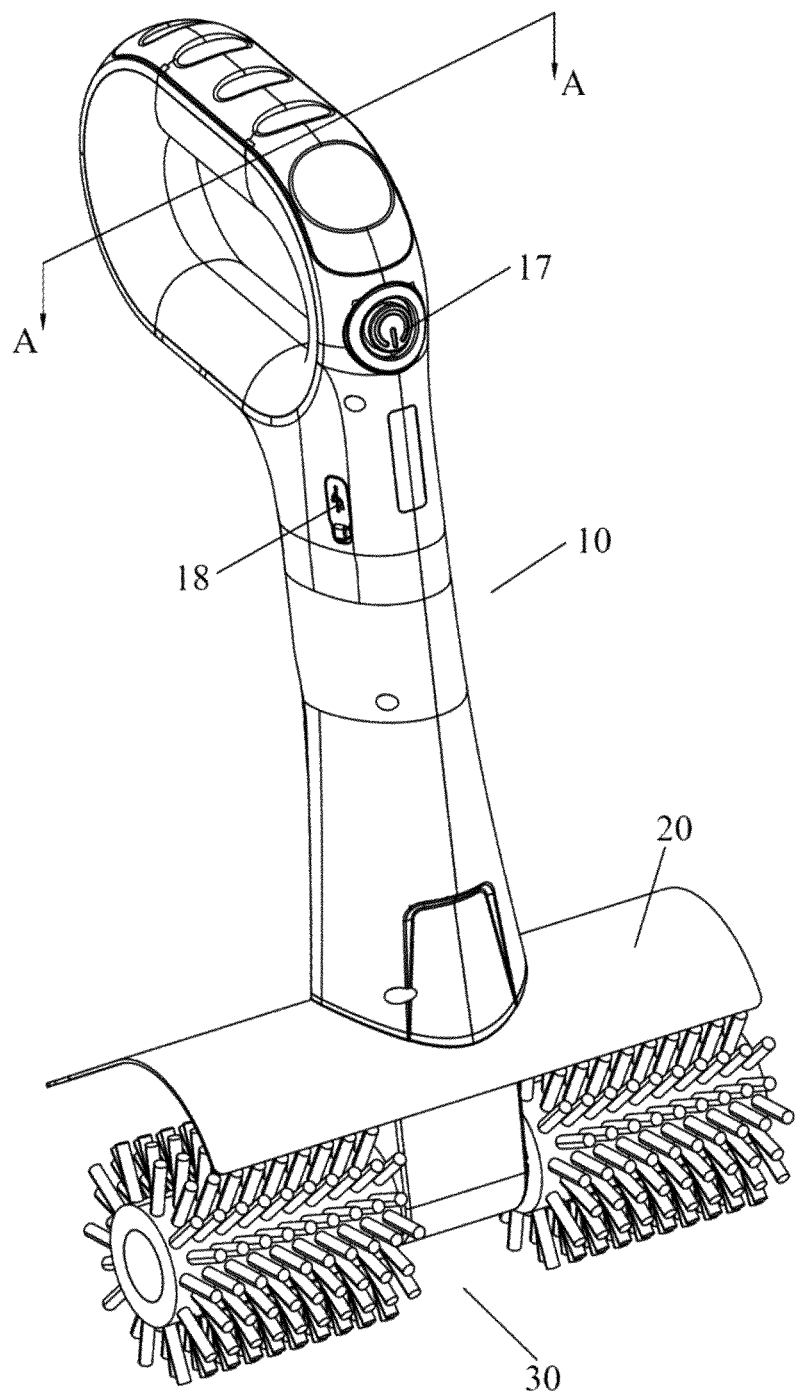
FIG. 2 is a schematic three-dimensional view of the cleaning brush from another viewing angle according to the invention.
Figure 3:
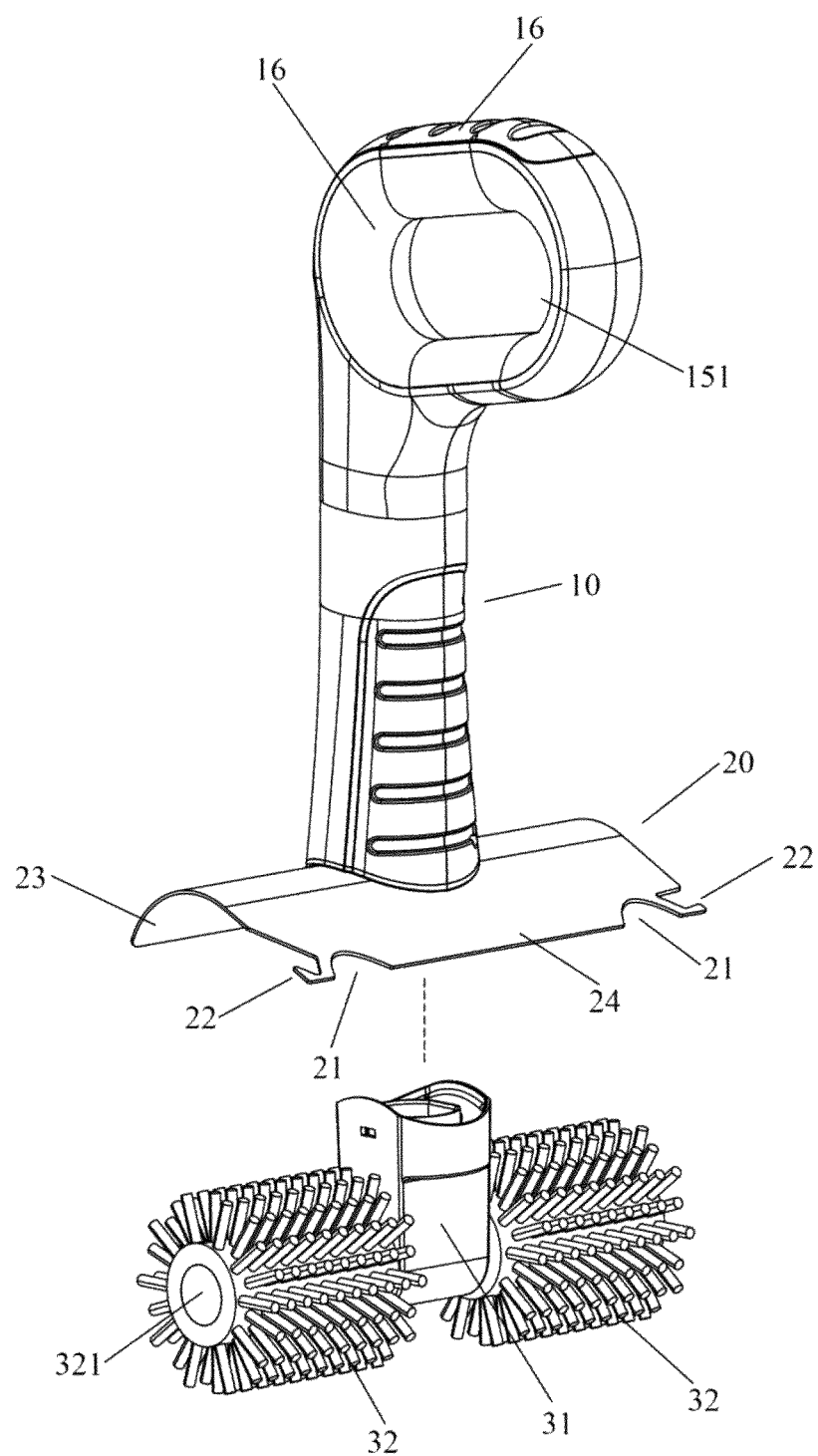
FIG. 3 is a schematic three-dimensional view of a handle and a brush head that are separate according to the invention.
Figure 4:
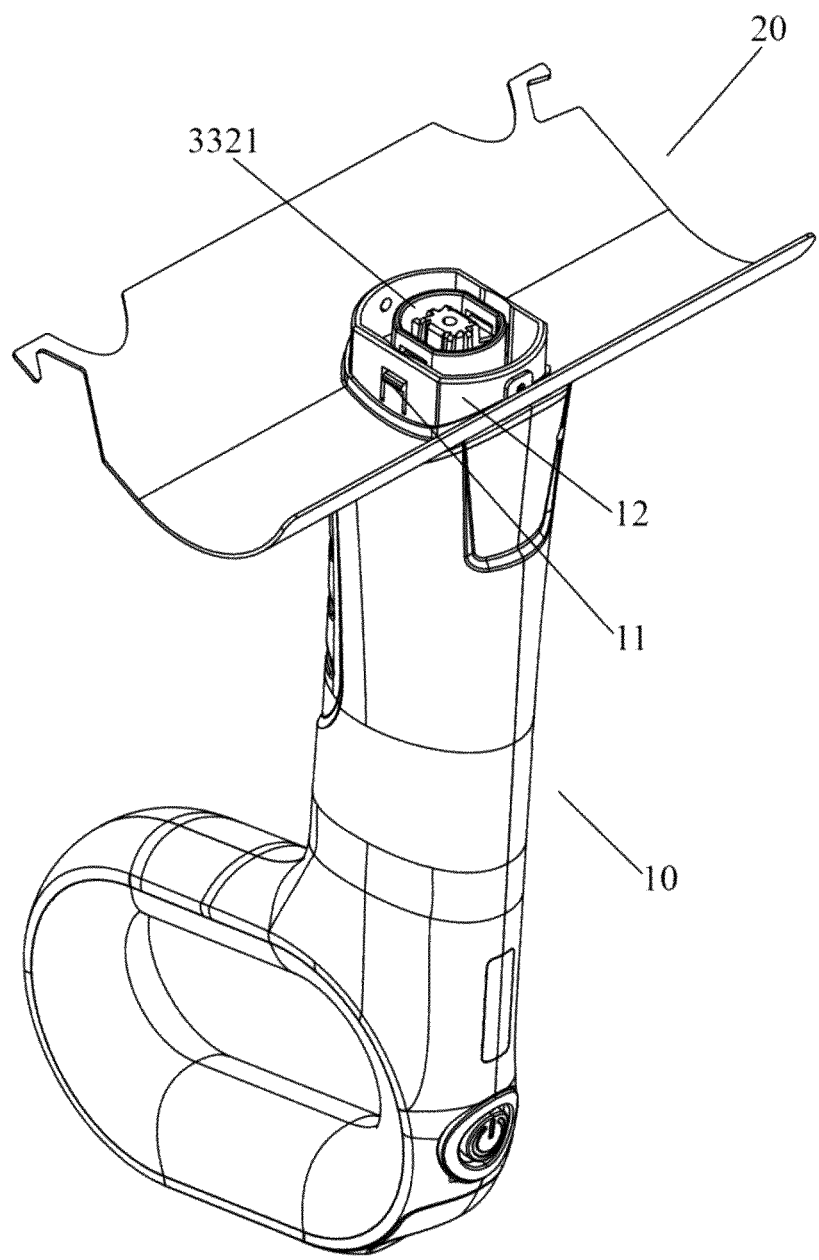
FIG. 4 is a schematic structural view of the handle and a bottom of the baffle.
Figure 5:
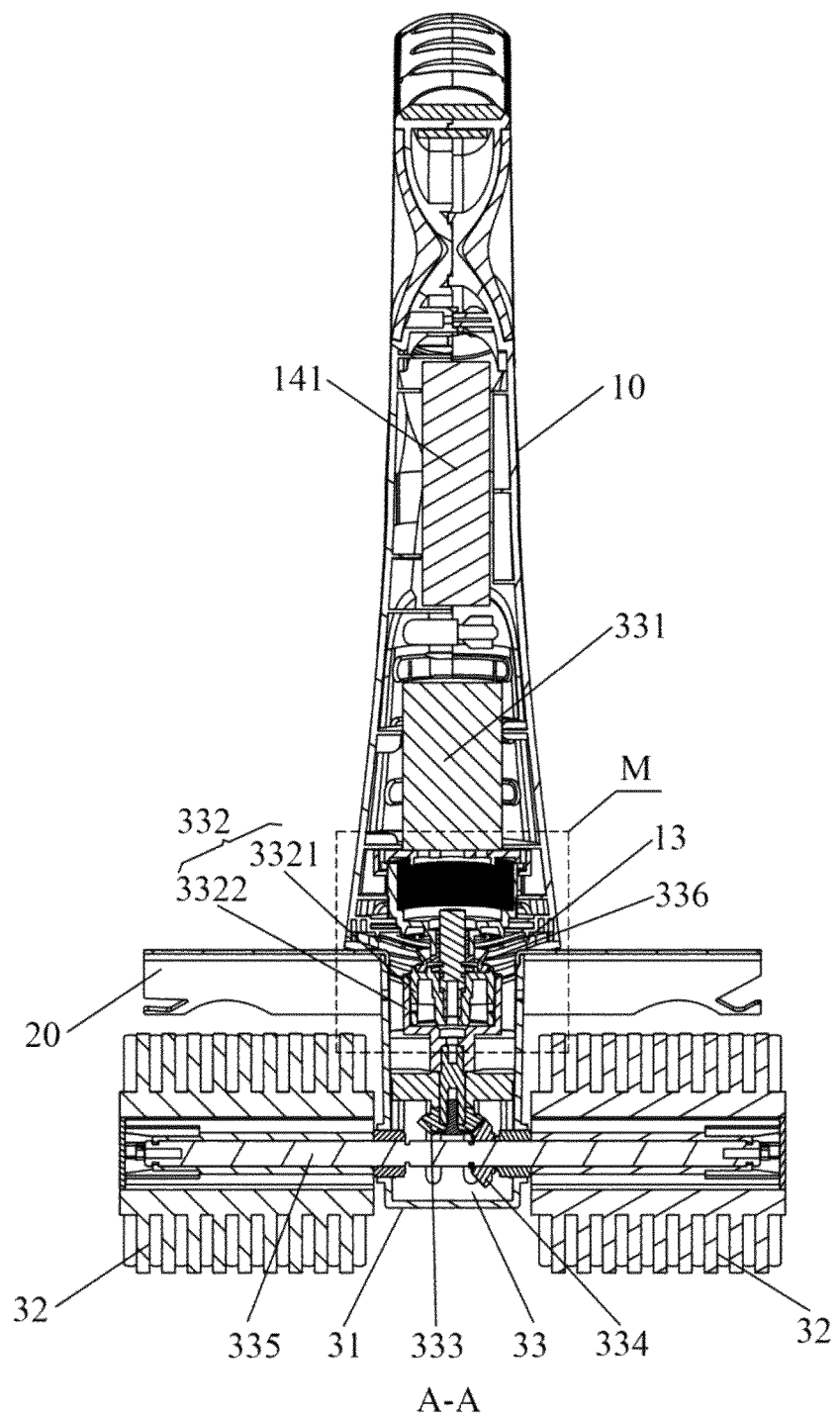
FIG. 5 is a schematic longitudinal sectional view of the cleaning brush taken along line A-A in FIG. 2.
Figure 6:
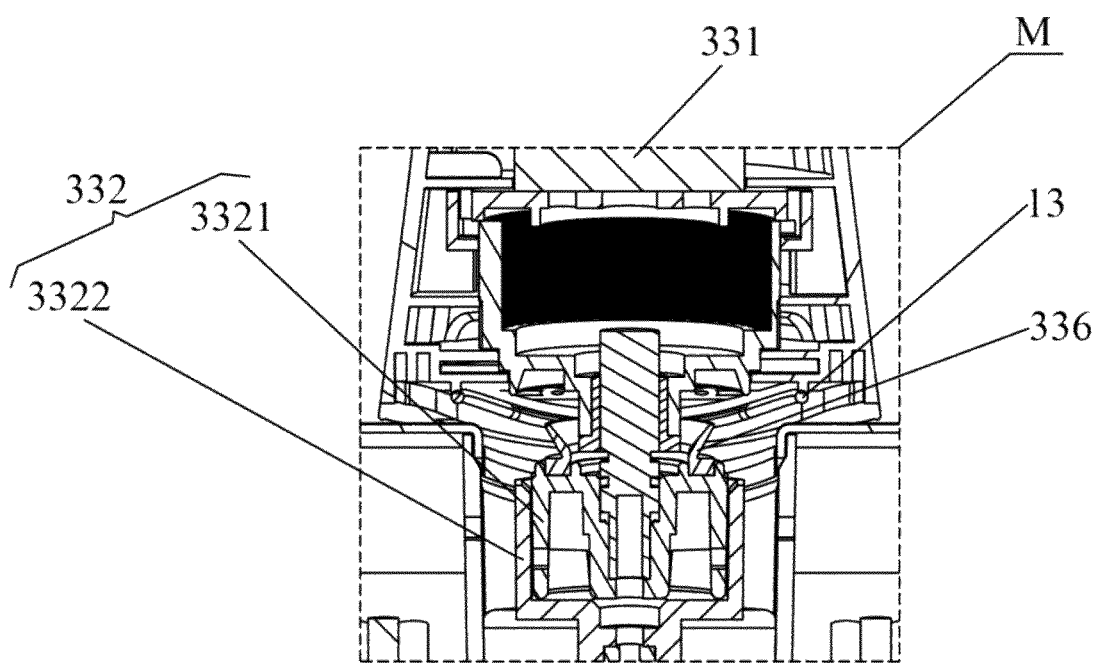
FIG. 6 is a schematic enlarged view of M in FIG. 5.
Figure 7:
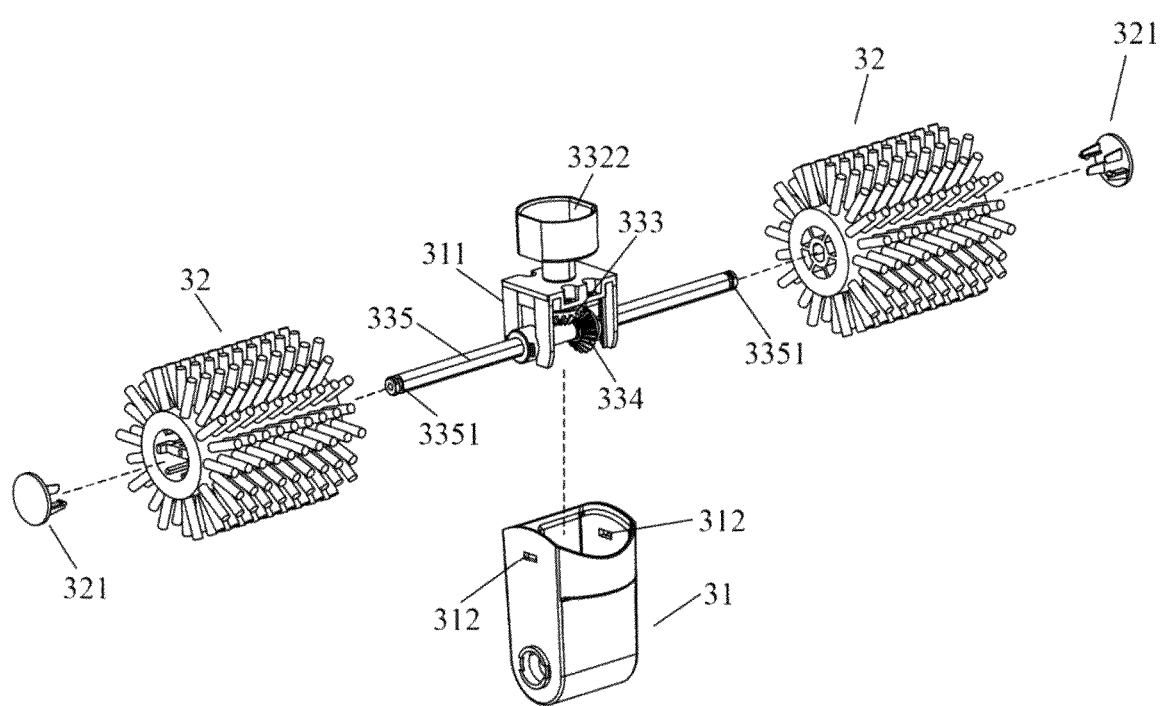
FIG. 7 is a schematic three-dimensional exploded view of a lower part of the brush head according to the invention.
Figure 8:
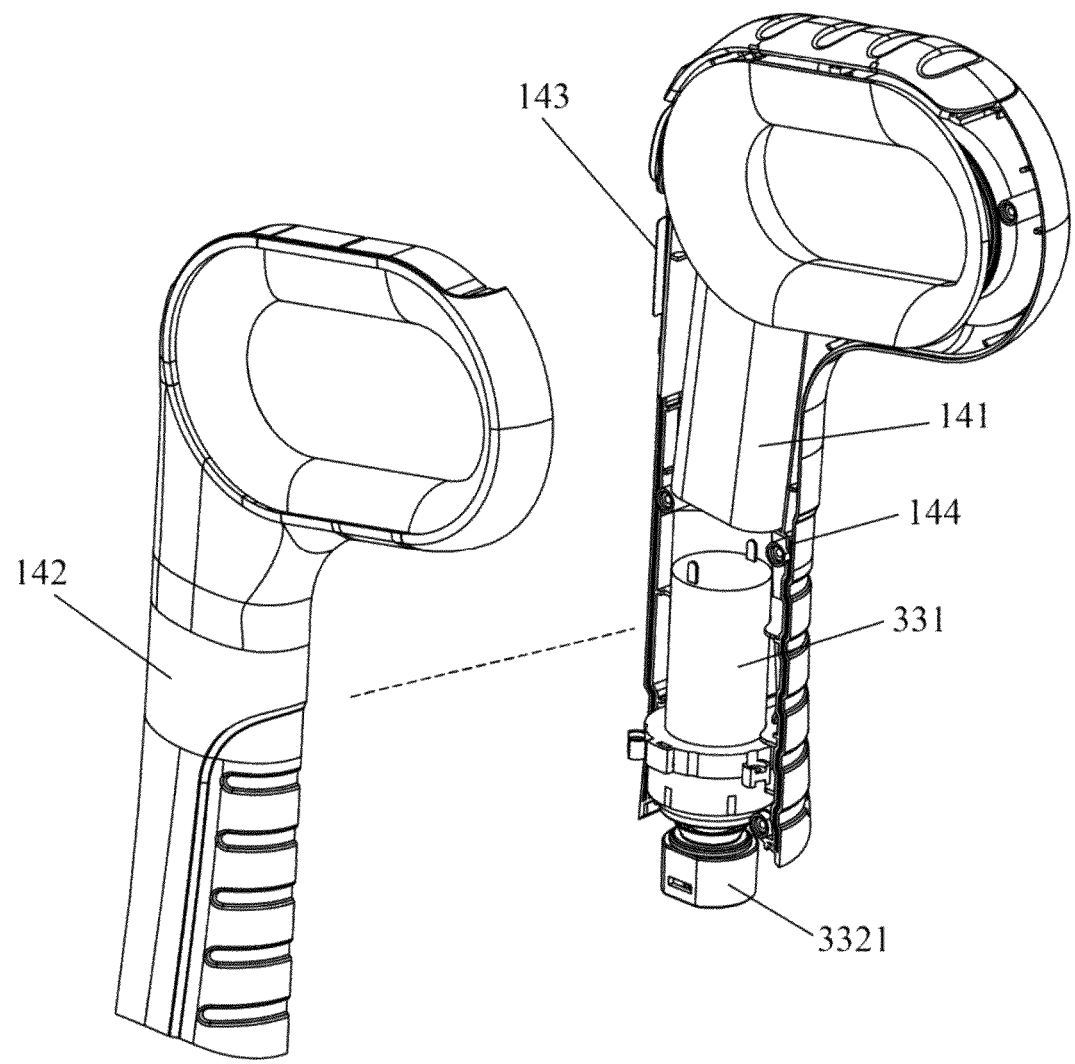
FIG. 8 is a schematic three-dimensional view of an internal structure of the handle according to the invention.
Figure 9:
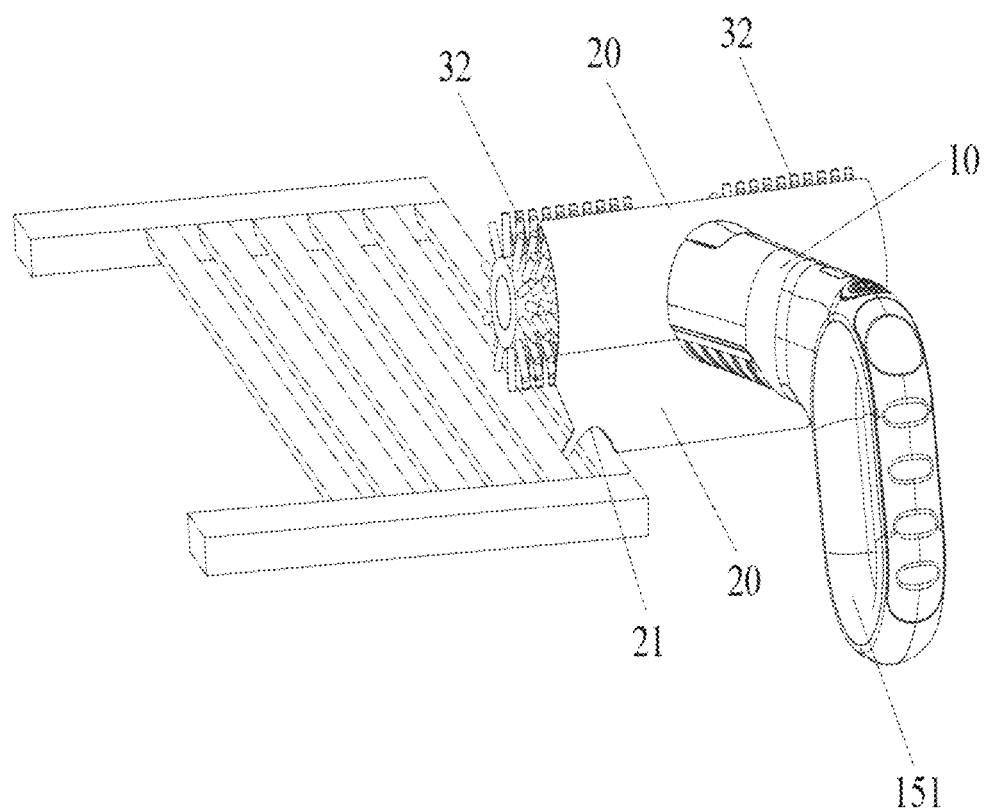
FIG. 9 is a schematic view of the cleaning brush in use according to the invention.

As shown in FIG. 1 to FIG. 9, an electric cleaning brush of the invention includes a handle 10, a baffle 20 and a brush head 30.

The brush head 30 is detachably mounted to a lower end of the handle 10, and the baffle 20 covers a top of the brush head 30. The brush head 30 includes a housing 31, roller brushes 32 and a driving mechanism 33 for driving the roller brushes 32 to rotate, and the housing 31 is detachably connected to the handle 10. The driving mechanism 33 includes a motor 331, a connecting unit 332, a first bevel gear 333, a second bevel gear 334 and a transmission shaft 335. The motor 331 is mounted in the handle 10. The connecting unit 332 is connected to a shaft end of the motor 331. The first bevel gear 333 is connected to the connecting unit 332. The second bevel gear 334 meshes with the first bevel gear 333. The transmission shaft 335 is transversely connected to the second bevel gear 334. The housing 31 covers an outside of the first bevel gear 333 and the second bevel gear 334. Two ends of the transmission shaft 335 transversely extend out of the housing 31. The roller brushes 32 are detachably mounted to the two ends of the transmission shaft 335.

A retaining bracket 311 is mounted in the housing 31. The first bevel gear 333 is rotatably mounted to a lower end of a top wall of the retaining bracket 311. The connecting unit 332 is connected to an upper end of the top wall of the retaining bracket 311 and fitted with the first bevel gear 333. The second bevel gear 334 is located below the retaining bracket 311, and the transmission shaft 335 transversely runs through the retaining bracket 311 and extends out of two sides of the housing 31.

An edge of the baffle 20 is provided with curved grooves 21 and scraping hooks 22 which are convenient for scraping. The baffle 20 is transversely mounted to the lower end of the handle 10. A front side plate 23 and a rear side plate 24 formed from the baffle 20 by separation of the handle 10 are curved downward. An area of the rear side plate 24 is greater than an area of the front side plate 23. Since the area of the rear side plate 24 is greater than the area of the front side plate 23, dust splashed by the rotation of the roller brushes 32 can be effectively blocked, so as to reduce the splashing of dirt onto the user during cleaning. The curved grooves 21 and the scraping hooks 22 are all located on an edge of the rear side plate 24, and the scraping hooks 22 are located on two sides of the rear side plate 24. By holding and pushing the cleaning brush, the curved grooves 21 and the scraping hooks 22 can be used to scrape an article having a rod, so that the stains remaining on the surface of the rod can be effectively removed, thereby making the cleaning brush applicable to multiple cleaning scenarios. The baffle 20 and the transmission shaft 335 are both made of metal, which can improve the overall structural strength and durability of the product and prolong the service life.

Side walls of the lower end of the handle 10 are provided with snap-fit protrusions 11. Side walls of the housing 31 are provided with snap-fit holes 312 corresponding to the snap-fit protrusions 11. The snap-fit protrusions 11 are detachably fitted with the snap-fit holes 312. Through the fit between the snap-fit protrusions 11 and the snap-fit holes 312, the brush head 30 can be dismounted from the handle 10, which is convenient for assembly and transportation. Moreover, the handle 10 or the brush head 30 can be replaced according to actual wear, so that the utilization rate of the product can be maximized. Besides, in addition to the fit between the snap-fit protrusions 11 and the snap-fit holes 312, a fit between a pin and a pin hole may also be used.

The lower end of the handle 10 is provided with an end cover 12, and the shaft end of the motor 331 runs downward into the end cover 12. The connecting unit 332 includes an upper connecting member 3321 and a lower connecting member 3322. The upper connecting member 3321 and the lower connecting member 3322 are fitted with each other and located in the end cover 12. The upper connecting member 3321 is connected to the shaft end of the motor 331. The driving force of the shaft end of the motor 331 is transmitted to the first bevel gear 333 through the connecting unit 332, and the first bevel gear 333 and the second bevel gear 334 are fitted to drive the transmission shaft 335 to rotate, thereby making the roller brushes 32 roll. Bristles on the roller brushes 32 clean the surface of the article as the roller brushes 32 roll. A V-shaped waterproof sealing ring 336 is arranged between the upper connecting member 3321 and the motor 331. The V-shaped waterproof sealing ring 336 can effectively prevent water from entering through the contact gap between the connecting unit 332 and the motor 331, thereby preventing water from entering the motor 331 and improving the waterproofness. An O-shaped waterproof ring 13 is arranged between the end cover 12 and the lower end of the handle 10. The O-shaped waterproof ring 13 can improve the sealing performance and effectively prevent the stains or water splashed by the rotation of the roller brushes 32 from entering the handle 10, thereby improving the overall waterproofness of the handle 10. It should be noted that the connecting unit 332 in the form of a single component instead of a combination of the upper connecting member 3321 and lower connecting member 3322 can also complete transmission of power, which is also within the protection scope of this application. In addition, no matter whether the connecting unit 332 is in the form of a single component or a combination, the V-shaped waterproof sealing ring 336 is located outside the shaft end of the motor 331 to block water and stains from entering the motor 331.

The handle 10 includes a main body portion 14 and a hand-held portion 15 arranged at an upper end of the main body portion 14. The hand-held portion 15 has a holding structure 151 for a hand of a user to pass through and hold. An inner wall and an outer top wall of the holding structure 151 are respectively provided with a soft rubber layer 16, which has an anti-skid effect. A battery 141 is further arranged in the main body portion 14. The battery 141 is electrically connected to the motor 331. An outer wall of the handle 10 is provided with an on/off button 17 for controlling the motor 331 to be on or off, a USB charging port 18 and a silicone plug 19. The USB charging port 18 is configured to charge the battery 141. The silicone plug 19 is configured to block the USB charging port 18 when the battery is not charged, so as to have dustproof and waterproof effects. The main body portion 14 includes a front housing 142 and a rear housing 143. The front housing 142 and the rear housing 143 are snap-fitted with each other, and a waterproof silicone strip 144 is arranged at the position of the snap-fit to seal the fitting gap between the front housing 142 and the rear housing 143, thereby improving the overall waterproofness.

The two ends of the transmission shaft 335 are respectively provided with limiting grooves 3351. A snap ring is detachably sleeved in each of the limiting grooves 3351. The roller brush 32 is located between the snap ring and the housing 31. Through the fit between the snap ring and the limiting groove 3351, the roller brush 32 is axially limited onto the transmission shaft 335, thereby preventing the roller brush from coming off. When the roller brush 32 needs replacement, the snap ring is removed, and then the roller brush 32 can be removed from the transmission shaft 335. The transmission shaft 335 and the roller brush 32 are relatively fixed in the circumferential direction. Specifically, an outer wall of the transmission shaft 335 and an inner wall of the roller brush 32 are provided with limiting surfaces that are closely fitted with each other, which can prevent the transmission shaft and the roller brush from relative rotation. An end portion of each of the roller brushes 32 is detachably provided with an end cap 321, so as to block the part where the roller brush 32 and the transmission shaft 335 limit each other, thereby preventing dust and water from entering.

The key points of design of the invention are as follows. The first bevel gear and the second bevel gear are used to change the direction of rotation, thereby solving the problem of high tendency to shifting of the traditional cleaning brush heads based on plane rotation. The cleaning brush of the invention has compact overall structure and small occupied space. The handle and the brush head that are detachably connected are used to realize quick assembly and disassembly of the handle and the brush head, and moreover, the handle and the brush head can be replaced as needed, which is flexible and convenient. Besides, the roller brushes are detachably fitted with the transmission shaft, so that the roller brushes are convenient to dismount and replace, thereby improving the utilization rate of the product, making the product convenient to maintain, and lowering the maintenance cost.

The above is only preferred embodiments of the invention, and is not intended to limit the technical scope of the invention in any form. Therefore, any minor modifications, equivalent changes and variations made to the above embodiments according to the technical essence of the invention still fall within the scope of the technical solutions of the invention.

What is claimed is:

1. An electric cleaning brush, comprising a handle, a baffle and a brush head, wherein the brush head is detachably mounted to a lower end of the handle, and the baffle covers a top of the brush head; the brush head comprises a housing, roller brushes and a driving mechanism for driving the roller brushes to rotate, and the housing is detachably connected to the handle; the driving mechanism comprises a motor, a connecting unit, a first bevel gear, a second bevel gear and a transmission shaft, the motor is mounted in the handle, the connecting unit is connected to a shaft end of the motor, the first bevel gear is connected to the connecting unit, the second bevel gear meshes with the first bevel gear, and the transmission shaft is transversely connected to the second bevel gear; and the housing covers an outside of the first bevel gear and the second bevel gear, two ends of the transmission shaft transversely extend out of the housing, and the roller brushes are detachably mounted to the two ends of the transmission shaft;

a retaining bracket is mounted in the housing, the first bevel gear is rotatably mounted to a lower end of a top wall of the retaining bracket, and the connecting unit is connected to an upper end of the top wall of the retaining bracket and fitted with the first bevel gear; and the second bevel gear is located below the retaining bracket, and the transmission shaft transversely runs through the retaining bracket and extends out of two sides of the housing; and the lower end of the handle is provided with an end cover, and the shaft end of the motor runs downward into the end cover; the connecting unit comprises an upper connecting member and a lower connecting member, the upper connecting member and the lower connecting member are fitted with each other and located in the end cover, and the upper connecting member is connected to the shaft end of the motor; and a V-shaped waterproof sealing ring is arranged between the upper connecting member and the motor, and an O-shaped waterproof ring is arranged between the end cover and the lower end of the handle.

2. The electric cleaning brush according to claim 1, wherein an edge of the baffle is provided with curved grooves and scraping hooks which are convenient for scraping.

3. The electric cleaning brush according to claim 2, wherein the baffle is transversely mounted to the lower end of the handle, a front side plate and a rear side plate formed from the baffle by separation of the handle are curved downward, and an area of the rear side plate is greater than an area of the front side plate.

4. The electric cleaning brush according to claim 3, wherein the curved grooves and the scraping hooks are all located on an edge of the rear side plate, and the scraping hooks are located on two sides of the rear side plate.

5. The electric cleaning brush according to claim 1, wherein side walls of the lower end of the handle are provided with snap-fit protrusions, side walls of the housing are provided with snap-fit holes corresponding to the snap-fit protrusions, and the snap-fit protrusions are detachably fitted with the snap-fit holes.

6. The electric cleaning brush according to claim 1, wherein the two ends of the transmission shaft are respectively provided with limiting grooves, a snap ring is detachably sleeved in each of the limiting grooves, and the roller brush is located between the snap ring and the housing.

7. The electric cleaning brush according to claim 1, wherein the handle comprises a main body portion and a hand-held portion arranged at an upper end of the main body portion, the hand-held portion has a holding structure for a hand of a user to pass through and hold, and an inner wall and an outer top wall of the holding structure are respectively provided with a soft rubber layer.

8. The electric cleaning brush according to claim 7, wherein a battery is further arranged in the main body portion, the battery is electrically connected to the motor, and an outer wall of the handle is provided with an on/off button for controlling the motor to be on or off.

* * * * *